3,466,177
BREAD FLAVOR CONCENTRATE
Robert H. Bundus, Riverside, and Anthony J. Luksas, Chicago, Ill., assignors to Beatrice Foods Co., Chicago, Ill., a corporation of Delaware
No Drawing. Continuation-in-part of application Ser. No. 567,371, July 25, 1966. This application Jan. 12, 1968, Ser. No. 697,320
Int. Cl. A23l 1/22
U.S. Cl. 99—140                          5 Claims

ABSTRACT OF THE DISCLOSURE

Synthetic bread flavor is produced by reducing the lactose content of whey which has from 6% to 40% total solids, adding yeast and growing the yeast for a period of up to 48 hours with intimate mixture of air during the growth period.

---

This application is a continuation-in-part of application Ser. No. 567,371, filed July 25, 1966.

The present invention relates to a bread flavor concentrate. In the parent application a synthetic bread flavor is prepared by growing yeast on a whey medium. The entire disclosure of the parent application is hereby incorporated by reference.

It has now been found that a bread flavor concentrate can be prepared by employing a whey medium low in lactose. Thus there can be employed whey diluted 1:10 with water. This particular dilution is not critical and can be more or less depending on the lactose content of the whey. Desirably, the lactose concentration should be no more than 1%, ideally 0.5%, with a minimum lactose concentration of 0.1%.

The whey either before or after dilution should be heated to a high temperature for a short period of time, e.g., 185° F. for 20–45 minutes, preferably 30 minutes, or 245° F. for 10 to 20 minutes, preferably 15 minutes, or 310° F. for 5 to 20 seconds, preferably 15 seconds. Preferably, the heat treatment is after dilution.

Preferably, the whey either before or after dilution is filtered or centrifuged to remove sediment or suspended matter or sediment precipitated by heat (e.g., due to the heat treatment set forth above).

The clear medium is subjected to fermentation in the presence of lactic acid. Thus there can be added any of the known microorganisms which produce lactic acid such as Streptococcus lactis, Lactobacillus bulgaricus, Lactobacillus lactis, Lactobacillus delbrueckii, Lactobacillus thermophilus, Lactobacillus casei, Lactobacillus leichmannii, Streptococcus citrovorus, etc. Fermentation is allowed to take place and is normally complete in 12 to 24 hours at a favorable growing temperature, e.g. 70 to 90° C. for all except the thermophilic organisms. Growing of the bacteria is preferably initiated under aerobic conditions although anaerobic conditions can be employed.

Then fermentation is continued for 24 to 48 hours after inoculation with bread flavor causing organisms, e.g., yeast of the Saccharomyces group such as Saccoromyces cerevisiae or unisporum. The yeast must be one that can grow on lactic acid.

The whey employed can be whey obtained in the manufacture of cottage cheese, cheddar cheese, Swiss cheese, Neufchatel cheese or cream cheese, for example. The preferred whey is cottage cheese whey.

The yeast is grown initially by an aerobic process in which there is preferably 1.5–1.6 p.p.m. of oxygen. However, as the assimilation continues the oxygen content goes down, eventually to zero. It is critical that the oxygen content should not be increased or maintained at a high level or the bread flavor either is not produced at all or the process of forming the bread flavor is slowed.

A constant oxygen feed is maintained during the fermentation but the growth of the yeast organism reduces the oxygen content of the media.

The product obtained is essentially water and bread flavor. It can be concentrated 10 to 100 times, preferably 100 times, and sold as bread flavor or it can be dried, e.g., spray dried to a stable product.

Unless otherwise indicated all parts and percentages are by weight.

The bread flavor concentrate can be added to bread of various types, e.g., white bread, rye bread, biscuits, rolls, whole wheat bread, raisin bread, bagels, etc. It can also be employed to impart a bread flavor to non-bread foods, e.g., to rice stuffing for turkeys and other fowl, dips made from cheese or sour cream, etc.

The bread flavor prepared by the process of the present case is even stronger than that obtained by the process of the parent case.

EXAMPLE 1

300 liters of cottage cheese whey having 16% total solids and 5% lactose was diluted with water 1:10 to obtain a mixture containing 0.5% lactose. The diluted mixture was heated at 185° F. for 30 minutes, centrifuged to remove suspended matter and the clear medium subjected to fermentation with Streptococcus lactis at 82° F. for 18 hours under aerobic conditions.

Then the fermented mixture was inoculated with Saccharomyces cerevisiae and vigorously aerated at 85° F. for 48 hours. The oxygen content at the time of introduction of the Saccharomyces was 1.6 p.p.m. but this gradually went down to almost zero during the fermentation. The product had a strong bread flavor and was concentrated 100 times by removing the water under a vacuum. The product was then refrigerated and stored for use. It was suitable for adding to bread dough prior to baking.

EXAMPLE 2

The procedure of Example 1 was repeated but instead of concentrating the bread flavor produced it was spray dried to give a stable synthetic bread flavor suitable for addition to bread dough, etc.

When the lactose concentration is preferably reduced by dilution with water it will be realized that it can be reduced by other means such as crystallization for example.

What is claimed is:

1. In the process of preparing a synthetic bread flavor by growing yeast on a medium consisting essentially of whey and in the presence of lactic acid wherein the whey medium has from 6% to 40% total solids therein and during the growth period the whey medium is intimately mixed with air throughout the growth period, the improvement comprising reducing the lactose concentration of the whey to not over 1% prior to addition of the yeast and continuing the growth period for up to 48 hours.

2. A process according to claim 1 wherein the lactose is converted to lactic acid prior to addition of the yeast with lactose fermenting organisms.

3. A process according to claim 2 wherein the lactose is between 0.1 and 1%.

4. A process according to claim 3 wherein the lactose is 0.5%.

5. A process according to claim 3 wherein the whey is heated at a temperature ranging from 185° F. for 20 to 45 minutes to a temperature of 310° F. for 1 to 20 seconds prior to addition of the lactose forming organisms.

References Cited
UNITED STATES PATENTS

| | | | |
|---|---|---|---|
| 2,465,870 | 3/1949 | Hanson et al. | 195—82 |
| 2,762,749 | 9/1956 | Myers et al. | 195—82 XR |
| 3,102,033 | 8/1963 | Jackel | 99—90 |

RAYMOND N. JONES, Primary Examiner

JAMES R. HOFFMAN, Assistant Examiner

U.S. Cl. X.R.

99—90